(12) United States Patent
Peng et al.

(10) Patent No.: US 11,522,480 B2
(45) Date of Patent: Dec. 6, 2022

(54) SPMSM SENSORLESS COMPOSITE CONTROL METHOD WITH DUAL SLIDING-MODE OBSERVERS

(71) Applicants: Xiangtan University, Xiangtan (CN); Foshan Green Intelligent Manufacturing Research Institute of Xiangtan University, Foshan (CN)

(72) Inventors: Siqi Peng, Xiangtan (CN); Yuhan Jiang, Zhuzhou (CN)

(73) Assignees: Xiangtan University, Xiangtan (CN); Foshan Green Intelligent Manufacturing Research Institute of Xiangtan University, Foshan (CN)

( * ) Notice: Subject to any disclaimer, the term of this patent is extended or adjusted under 35 U.S.C. 154(b) by 0 days.

(21) Appl. No.: 17/829,094

(22) Filed: May 31, 2022

(65) Prior Publication Data

US 2022/0294375 A1    Sep. 15, 2022

Related U.S. Application Data

(63) Continuation of application No. PCT/CN2021/124411, filed on Oct. 18, 2021.

(30) Foreign Application Priority Data

Nov. 12, 2020   (CN) .......................... 202011264703.7

(51) Int. Cl.
*H02P 21/00* (2016.01)
*H02P 21/20* (2016.01)
*H02P 21/22* (2016.01)

(52) U.S. Cl.
CPC .......... *H02P 21/0007* (2013.01); *H02P 21/20* (2016.02); *H02P 21/22* (2016.02)

(58) Field of Classification Search
CPC ....... H02P 21/22; H02P 21/20; H02P 21/0007
(Continued)

(56) References Cited

U.S. PATENT DOCUMENTS

| 10,541,632 | B2 * | 1/2020 | Schneider | ............... H02P 21/04 |
| 2014/0028228 | A1 * | 1/2014 | Huang | ................... H02P 21/22 |
| | | | | 318/400.32 |

(Continued)

FOREIGN PATENT DOCUMENTS

| CN | 103117703 A | 5/2013 |
| CN | 103997272 A | 8/2014 |

OTHER PUBLICATIONS

CNIPA, Notification of a First Office Action for CN202011264703. 7, dated Mar. 3, 2022.

(Continued)

*Primary Examiner* — Erick D Glass
(74) *Attorney, Agent, or Firm* — Hemisphere Law, PLLC; Zhigang Ma

(57) ABSTRACT

A PMSM sensorless composite control method with dual sliding-mode observers is provided. In particular, two sliding-mode observers are designed, one provides an exponential piecewise sliding-mode function for observation of back electromotive force, and the other sliding-mode observer is for observation of load torque and fine-tuning parameters of a piecewise PI controller while introducing an estimated load torque onto a q-axis for feedforward compensation. A q-axis current inner loop is designed with a second-order sliding-mode controller, which can improve tracking performance of q-axis current and indirectly control an electromagnetic torque. The exponential piecewise sliding-mode function is more conductive to the observation of back electromotive force and can weaken the buffeting phenomenon. The sliding-mode observer for observing the load torque fine-tunes parameters of the piecewise PI controller (Continued)

while performing the feedforward compensation, the load capability of the system is improved. The second-order sliding-mode controller can reduce a torque ripple.

3 Claims, 7 Drawing Sheets

(58) Field of Classification Search
USPC .................................................. 318/400.02
See application file for complete search history.

(56) References Cited

U.S. PATENT DOCUMENTS

2018/0131305 A1\* 5/2018 Wang ................. H02P 21/0021
2018/0367073 A1\* 12/2018 Haas ......................... H02P 6/16

OTHER PUBLICATIONS

Xiangtan University (Applicant), Reply to Notification of a First Office Action for CN202011264703.7 w/ Replacement Claims.
CNIPA, Notification to grant patent right for invention for CN202011264703.7 w/ allowed claims, dated May 7, 2022.

\* cited by examiner

SPMSM SENSORLESS COMPOSITE CONTROL METHOD WITH DUAL SLIDING-MODE OBSERVERS

TECHNICAL FIELD

The invention belongs to the field of permanent magnet synchronous motor control, and relates to a sensorless composite control method with dual sliding-mode observers, in particularly to a simple, easy to implement, and effect excellent composite control method with dual sliding-mode observers to realize a system model of sensorless control of permanent magnet synchronous motor in medium and high speed domains.

BACKGROUND

Permanent magnet synchronous motors (PMSMs) are mainly classified into a surface-mounted permanent magnet synchronous motor (SPMSM) and an interior permanent magnet synchronous motor (IPMSM), and have characteristics of simple structure, small size, high power density, high efficiency and easy maintenance, and their superior speed regulation performances make them widely used in many fields, such as industrial manufacturing, intelligent robots, new energy vehicles and so on. As applications of permanent magnet synchronous motors becoming more and more widespread, requirements for their control performance also become higher and higher. At present, many scholars mainly focus on two aspects of motor structure design and motor control performance, good control algorithms can greatly improve performances of systems, control methods commonly used in permanent magnet synchronous motors mainly are field-oriented control (FOC) and direct torque control (DTC). The FOC usually uses a proportional-integral (PI) controller to realize dual closed-loop controls, which measures a stator current vector of a permanent magnet synchronous motor and then decomposes the current vector into an excitation current and a torque current through coordinate transformation, to indirectly control a magnetic flux linkage and a torque of the permanent magnet synchronous motor; and has characteristics of high accuracy and good dynamic and steady state performance. The DTC usually uses a bang-bang control to directly control a magnetic flux linkage and a torque of a permanent magnet synchronous motor, which eliminates the coordinate transformation and current control in the FOC and has better rapidity.

To achieve high-performance dual closed-loop vector controls of a permanent magnet synchronous motor, its purpose is to obtain real-time and accurate speed information and rotor position information, most of controls are configured with mechanical sensors, such as photoelectrical encoders. However, the mechanical sensors have problems such as high cost, easy to damage, and poor performance in harsh working environment, and therefore in order to solve the problems caused by mechanical sensors, a dual closed-loop vector control strategy for a permanent magnet synchronous motor is implemented by an algorithm to estimate rotor position and speed instead of the mechanical sensor. Accordingly, the research of sensorless control algorithms for permanent magnet synchronous motors has become a contemporary craze.

In order to realize a sensorless permanent magnet synchronous motor, two methods are often used. In particular, one method is based on signal injection, and a principle is to use a saliency ratio of the motor to estimate a rotor position, and commonly used methods are a pulsating voltage injection method and a rotating high frequency voltage injection method. The other method is to use an observer to observe a back electromotive force (EMF) in a dynamic model to thereby extract rotor position information. According to a mathematical model of permanent magnet synchronous motor, it is known that the back EMF is related to an electrical angular speed, and therefore only in medium and high speeds, the back EMF is more significant and thus is conducive to observation and extraction; and mature and commonly used methods are a sliding-mode observer method, a model reference adaptive control method, a Kalman filter based method, and so on. Compared with the other two methods, the sliding-mode observer method has more significant advantages and more mature development in sensorless control systems. However, the existing sliding-mode observer has the problems of severe buffeting phenomenon and poor load capability, which leads to poor control performance of the whole system. Therefore, it is necessary to propose a sliding-mode observer control algorithm with better dynamic and steady performance, less buffeting and better load capacity, which would have more extensive practical application value.

SUMMARY

An objective of the invention mainly is to solve problems of poor tracking performance of a PI controller to rotational speed loop and quadrature-axis (q-axis) current loop in a dual closed-loop vector control process for a permanent magnet synchronous motor, difficult parameter adjustment, and buffeting phenomenon and poor load capacity of the existing sliding-mode observer.

The invention provides an exponential piecewise sliding-mode function to replace a switching function in the existing sliding-mode observer to observe a back EMF and then to estimate accurate rotational speed and rotor position information, so as to realize the rotational speed loop closed-loop and Park coordinate transformation of vector control for the permanent magnet synchronous motor, which can eliminate the use of mechanical position sensor. Moreover, the estimated rotational speed information and a q-axis feedback current (obtained by Clark and Park transformation after sampling a three-phase current of motor windings through a phase current sampling circuit of a driving board) are used as input, and an estimated load torque is obtained through a designed load sliding-mode observer. According to an electromagnetic torque formula of a surface-mounted permanent magnet synchronous motor that $T_e=T_L=1.5\psi_f i_q$, the estimated load torque is transformed into a q-axis current compensation value and then added to the output of a piecewise PI controller of rotational speed outer loop to realize feedforward compensation and thereby improve the load capability. The rotational speed outer loop is designed with the piecewise PI controller, and the piecewise PI controller uses the load torque estimated by the designed load sliding-mode observer as a judgment criterion (also referred to as judgement reference) to fine-tune proportional and integral parameters of the PI controller of rotational speed outer loop, so that the system can adapt to two working conditions of no-load operation and on-load operation. In addition, a second-order sliding-mode controller based on a super-twisting algorithm is proposed to replace the PI controller of q-axis current inner loop. The invention may have advantages of small over tune amount, small buffeting phenomenon, superior dynamic and steady state performances and good load capability. FIG. 1 illustrates a schematic overall principle block diagram of a control strategy according to the invention.

In order to solve the above problems, technical solutions as proposed may be as follows.

An embodiment of the invention provides a sensorless composite control method with dual sliding-mode observers, a purpose thereof is to weaken the buffeting phenomenon and improve the dynamic and steady state performances and load capability of the system. The sensorless composite control method will be described as follows.

1. an exponential piecewise sliding-mode function is provided to observe a back EMF of a motor. An expression of the exponential piecewise sliding-mode function is that:

$$z(s_{\alpha\beta}) = \begin{cases} 1, & s_{\alpha\beta} \geq \sigma \\ \dfrac{s_{\alpha\beta}^2}{\sigma^2(1+e^{-\sigma})}, & 0 \leq s_{\alpha\beta} < \sigma \\ \dfrac{s_{\alpha\beta}^2}{\sigma^2(1+e^{-\sigma})}, & -\sigma \leq s_{\alpha\beta} < 0 \\ -1, & s_{\alpha\beta} < -\sigma \end{cases}$$

where $\sigma$ is a thickness of a boundary layer, and $s_{\alpha\beta}$ is a sliding-mode surface.

The exponential piecewise sliding-mode function has a saturation characteristic of a switching function outside the boundary layer, has a small portion of step characteristics at the boundary layer to accelerate a speed of the system approaching the sliding-mode surface on the prerequisite of without crossing the sliding-mode surface, and has characteristics of exponential approach law and continuity inside the boundary layer so that the closer to the sliding-mode surface, the slower the approaching is, it is not easy to cross the sliding-mode surface and can avoid multiple jump fluctuations along the sliding-mode surface in a process of system convergence, and thus can well weaken the buffeting phenomenon. The Lyapunov stability criterion is used to analyze the stability of the designed exponential piecewise sliding-mode observer.

A mathematical model (i.e., current state equation) for a permanent magnet synchronous motor is as follows:

$$\begin{cases} \dfrac{di_\alpha}{dt} = \dfrac{R_s}{L_s}i_\alpha + \dfrac{u_\alpha}{L_s} - \dfrac{e_\alpha}{L_s} \\ \dfrac{di_\beta}{dt} = \dfrac{R_s}{L_s}i_\beta + \dfrac{u_\beta}{L_s} - \dfrac{e_\beta}{L_s} \end{cases}.$$

The sliding-mode surface is set as $$s_{\alpha\beta} = \hat{i}_{\alpha\beta} - i_{\alpha\beta} = \begin{bmatrix} s_\alpha \\ s_\beta \end{bmatrix} = \begin{bmatrix} \hat{i}_\alpha - i_\alpha \\ \hat{i}_\beta - i_\beta \end{bmatrix},$$

the current state equation for the permanent magnet synchronous motor is reconstructed as that:

$$\begin{cases} \dfrac{d\hat{i}_\alpha}{dt} = \dfrac{R_s}{L_s}\hat{i}_\alpha + \dfrac{u_\alpha}{L_s} - \dfrac{Kz(s_\alpha)}{L_s} \\ \dfrac{d\hat{i}_\beta}{dt} = \dfrac{R_s}{L_s}\hat{i}_\beta + \dfrac{u_\beta}{L_s} - \dfrac{Kz(s_\beta)}{L_s} \end{cases}.$$

The reconstructed current state equation is subtracted by the mathematical model for the permanent magnet synchronous motor, to obtain a current error state equation for the permanent magnet synchronous motor as follows:

$$\begin{cases} \dfrac{d\tilde{i}_\alpha}{dt} = \dfrac{R_s}{L_s}\tilde{i}_\alpha + \dfrac{e_\alpha}{L_s} - \dfrac{Kz(s_\alpha)}{L_s} \\ \dfrac{d\tilde{i}_\beta}{dt} = \dfrac{R_s}{L_s}\tilde{i}_\beta + \dfrac{e_\beta}{L_s} - \dfrac{Kz(s_\beta)}{L_s} \end{cases},$$

$$\begin{cases} e_\alpha = -w_e\psi_f\sin\theta_e \\ e_\beta = w_e\psi_f\cos\theta_e \end{cases},$$

where, K is a sliding-mode gain, $R_s$ and $L_s$ respectively are stator resistance and inductance, $i_\alpha$, $i_\beta$, $u_\alpha$, $u_\beta$ respectively are stator currents and voltages in a stationary coordinate system; $e_\alpha$, $e_\beta$ respectively are components on $\alpha$ and $\beta$ axes of a back EMF, $w_e$ is an electrical angular speed, $\psi_f$ is a permanent magnet flux linkage, $\theta_e$ is an electrical angle.

When $\tilde{i}_{\alpha\beta} = \hat{i}_{\alpha\beta} - i_{\alpha\beta} = 0$, i.e., an estimated current and the sampled actual current are equal, the back EMF components of the motor are equal to the exponential piecewise sliding-mode function multiplying the sliding-mode gain, that is:

$$\begin{cases} e_\alpha = Kz(s_\alpha) \\ e_\beta = Kz(s_\beta) \end{cases}.$$

According to the Lyapunov stability criterion, the stability of the exponential piecewise sliding-mode observer proposed by the invention is analyzed, and the Lyapunov function is selected as that: $V(x) = \frac{1}{2}s_{\alpha\beta}^2$, if the condition of $\dot{V}(x) < 0$ is satisfied, the system is asymptotically stabilized on the sliding-mode surface and the sliding modal exists, and thus:

$$\dot{V}(x) = s_{\alpha\beta}^T \dot{s}_{\alpha\beta} = As_{\alpha\beta}^T s_{\alpha\beta} + Bs_{\alpha\beta}^T(e_s - Kz(s_{\alpha\beta})) < 0,$$

where $$A = \begin{bmatrix} -\dfrac{R_s}{L_s} & 0 \\ 0 & -\dfrac{R_s}{L_s} \end{bmatrix}$$

is a negative definite matrix, the inductance matrix $$B = \begin{bmatrix} \dfrac{1}{L_s} \\ \dfrac{1}{L_s} \end{bmatrix},$$

and the back EMF matrix $$e_s = \begin{bmatrix} e_\alpha \\ e_\beta \end{bmatrix}.$$

Since $As_{\alpha\beta}^T s_{\alpha\beta} < 0$, if it requires to meet condition of $\dot{V}(x) < 0$, it only needs to meet the condition of $Bs_{\alpha\beta}^T(e_s - Kz(s_{\alpha\beta})) < 0$, and thus it only needs to meet that the sliding-mode gain $K > \max(|e_\alpha, e_\beta\beta)$. A relatively accurate sliding-mode gain can be selected by the trial-and-error method to make the designed exponential piecewise sliding-mode observer satisfy the Lyapunov stability criterion and thus have asymptotic stability.

2. considering the immeasurability of load in the process of practical application, the invention designs a sliding-mode observer to observe a load torque in real-time and realize fine-tuning and feedforward compensation of piecewise PI parameters. The design of load sliding-mode observer and Lyapunov stability analysis are as follows.

According to a torque dynamic state equation of the permanent magnet synchronous motor, it is reconstructed to design a load sliding-mode observer to observe the load torque. An equation of the load sliding-mode observer as designed is as follows:

$$\begin{bmatrix} \dot{\hat{w}}_m \\ \dot{\hat{T}}_L \end{bmatrix} = \begin{bmatrix} 0 & -\frac{1}{J} \\ 0 & 0 \end{bmatrix} \begin{bmatrix} \hat{w}_m \\ \hat{T}_L \end{bmatrix} + \begin{bmatrix} \frac{1}{J} \\ 0 \end{bmatrix} T_e + \begin{bmatrix} 1 \\ l \end{bmatrix} U,$$

where a sliding-mode control law is $U = -a_1 \text{sign}(s_w) - a_2 s_w$; $a_1$ and $a_2$ are control parameters.

The torque dynamic state equation of permanent magnet synchronous motor is subtracted from the sliding-mode observer equation, to obtain a torque dynamic error state equation as follows:

$$\begin{cases} \dot{e}_1 = -\frac{1}{J} e_2 + U \\ \dot{e}_2 = lU \end{cases},$$

where, the sliding-mode surface is set as that: a mechanical angular speed error $s_w = e_1 = \hat{w}_m - w_m$, a load torque error $e_2 = \hat{T}_L - T_L$, $w_m$ is an actual angular speed of the permanent magnet synchronous motor, $\hat{w}_m$ is an estimated mechanical angular speed, J is a Moment of inertia, $T_e$ is an electromagnetic torque, $\hat{T}_L$ is a load torque estimated by the load sliding-mode observer, and l is a control parameter.

According to Lyapunov stability criterion, the Lyapunov function is selected as $V(x) = \frac{1}{2} s_w^2$, the system needs to satisfy a stability condition that $\dot{V}(x) = s_w \dot{s}_w < 0$, and the following can be obtained:

$$\dot{V}(x) = s_w \dot{s}_w e_1 \left[ -\frac{1}{J} e_2 - a_1 \text{sign}(e_1) - a_2 e_1 \right] < 0.$$

The setting process of the control parameters of $a_1$, $a_2$ and l is analyzed as follows:

(1) when the mechanical angular speed error $e_1 > 0$, the Lyapunov stability criterion can be met as long as $$-\frac{1}{J} e_2 - a_1 \text{sign}(e_1) - a_2 e_1 < 0$$

is met.

① when $e_2 > 0$, only need to meet that $$a_1 \geq \frac{-e_2}{J},$$

$a_2 \geq 0$.

② when $e_2 < 0$, only need to meet that $$a_1 \geq \frac{e_2}{J},$$

$a_2 \geq 0$.

(2) when the mechanical angular speed error $e_0 < 0$, the Lyapunov stability criterion can be met as long as $$-\frac{1}{J} e_2 - a_1 \text{sign}(e_1) - a_2 e_1 > 0$$

is met.

① when $e_2 > 0$, only need to meet that $$a_1 \geq \frac{e_2}{J},$$

$a_2 \geq 0$.

② when $e_2 < 0$, only need to meet that $$a_1 \geq \frac{-e_2}{J},$$

$a_2 \geq 0$.

Therefore, the designed load sliding-mode observer can reach and stabilize on the sliding-mode surface, according to an equivalent control principle, i.e., when $e_1 = \dot{e}_1 = 0$, control ranges of the control parameters $a_1$, $a_2$ are that $$a_1 \geq \frac{|e_2|}{J},$$

$a_2 \geq 0$; and then performs fine-tuning according to the trial-and-error method to select correct $a_1$, $a_2$. After stabilizing on the sliding-mode surface, $$\dot{e}_2 - \frac{l}{J} e_2 = 0, \text{ and } e_2 = c e^{\frac{l}{J} t}$$

can be obtained after solving, where c is a constant, and when l<0, the load torque error converges to 0 at an exponential approaching speed, that is, the observed load torque can track the actual load torque in real-time.

In summary, the estimated mechanical angular speed $\hat{w}_m$ and q-axis feedback current $i_q$ are input into the designed load sliding-mode observer, according to the calculated setting ranges of control parameters that $$l < 0, a_1 \geq \frac{|e_2|}{J},$$

$a_2 \geq 0$, and further control parameters are tuned to be correct according to the trial-and-error method, thereby realizing the real-time observation of load torque.

3. considering a temperature of the motor will increase during an on-load operation, and an inductance parameter will be reduced, so that the parameter setting of the rotational speed outer loop PI controller will be changed. In order to make the system better adapt to no-load operation and on-load operation, the invention designs a piecewise PI controller, and takes the presence or absence of load torque as the judgment condition to realize the fine tuning of parameters of the PI controller. An adjustment criterion of the piecewise PI parameters is as follows.

(1) when the estimated load torque $\hat{T}_L$ is less than a preset error tolerance ε, PI parameters of rotational speed outer loop with no-load operation are used.

(2) when the estimated load torque $\hat{T}_L$ is greater than the preset error tolerance ε, PI parameters of rotational speed outer loop with on-load operation are used.

4. Considering the poor tracking performance of PI controller, and the problem that PI controller of q-axis current inner loop will lead to a large torque ripple in the dual closed-loop vector control system of permanent magnet synchronous motor, according to the electromagnetic torque calculation formula $T_e=1.5p_n\psi_f i_q$, q-axis current $i_s$ and the electromagnetic torque $T_e$ show a linear relationship, and thus the invention proposes a super-twisting algorithm based second-order sliding-mode controller on the q-axis, to improve the tracking performance of q-axis current and indirectly reduce torque ripple. The invention exemplarily sets a quadrature-axis current sliding-mode surface as $s_q = i_q^* - i_q$, according to a specific expression of the super-twisting algorithm based second-order sliding-mode controller, the q-axis current controller can be designed as that:

$$\begin{cases} u_q = -K_p|s_q|^{0.5}\text{sign}(s_q) + u_{sq} \\ \dfrac{du_{sq}}{dt} = K_i\text{sign}(s_q) \end{cases},$$

Where, $K_p$, $K_i$ are design parameters (also referred to as adjustable parameters), and sign( ) is a switching function (also referred to as sign function).

The SPMSM sensorless composite control method with dual sliding-mode observers according to an embodiment of the invention is verified by MATLAB/Simulink simulation with a permanent magnet synchronous motor model, where parameters of the permanent magnet synchronous motor are that: the stator resistance $R_s=2.875\Omega$, the stator inductance $L_s=0.0085H$, the permanent magnet flux linkage $\psi_f=0.175$, the pole pair number p=4, the Moment of inertia J=0.001 N·M, and the working mode is that 5 N·M of load is suddenly added at the time of 0.2 s.

The invention may have the features as follows:

1. a boundary layer thickness of the exponential piecewise sliding-mode function is σ=0.0002, and the sliding-mode gain coefficient is K=200;

2. the parameter setting of the load sliding-mode observer is that $a_1=10000$, $a_2=500$;

3. the parameter setting of the super-twisting algorithm based second-order sliding-mode controller of q-axis current inner loop is that: $K_p=180$, $K_i=20$.

The sensorless composite control system model with dual sliding-mode observers according to the invention may have the following beneficial effects.

1, an exponential piecewise sliding-mode function is provided, which can weaken the buffeting phenomenon, and is more conducive to the observation of back EMF, and has higher accuracy of estimated rotational speed and rotor position information, thereby can improve the stability of system.

2, a piecewise PI controller is provided in the rotational speed outer loop, the load sliding-mode observer is designed to observe the load torque and thereby fine-tune parameters of the piecewise PI controller, so that it can adapt to two different working conditions of no-load operation and sudden load operation, and meanwhile, the load torque is introduced into the q-axis for feedforward compensation, which can improve the load capability of the system.

3, a super-twisting algorithm based second-order sliding-mode controller is provided for the q-axis current inner loop, which can improve the tracking performance of q-axis current and reduce the torque ripple.

BRIEF DESCRIPTION OF THE DRAWINGS

The invention is further described below in combination with the accompanying drawings and embodiments.

DETAILED DESCRIPTION OF EMBODIMENTS

Figure 1:
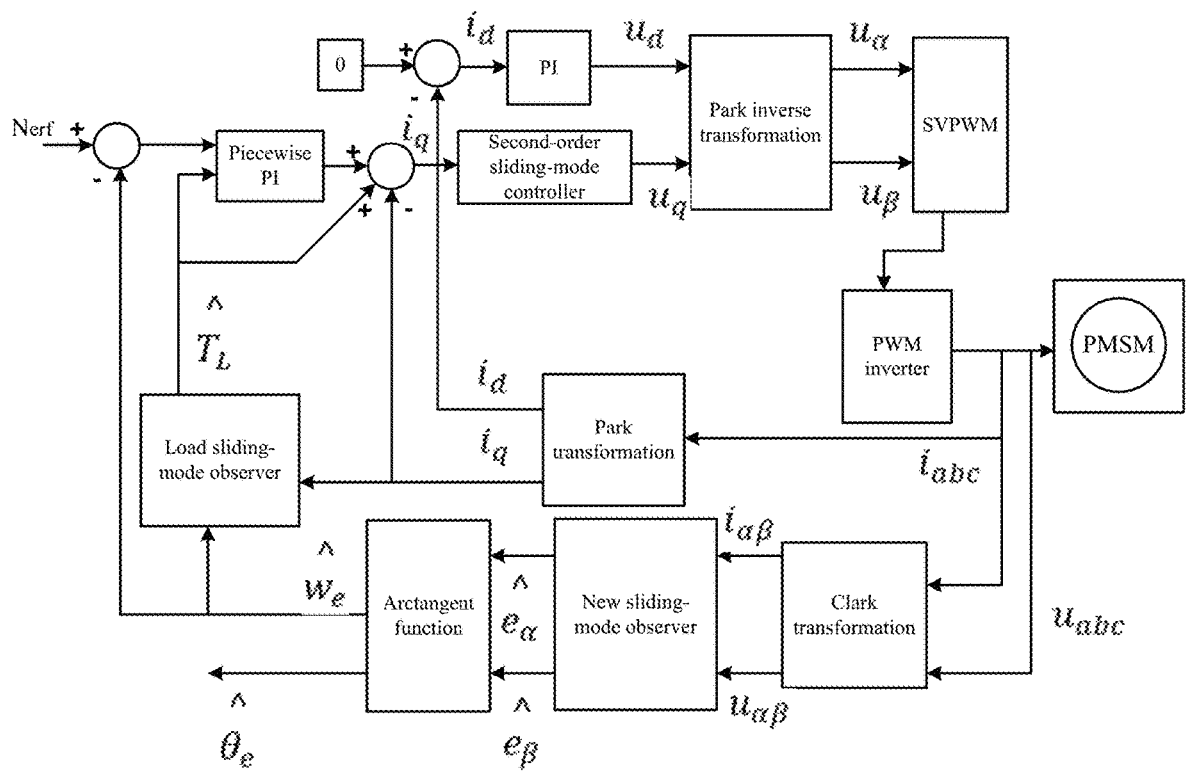
FIG. 1 illustrates a schematic principle block diagram of a SPMSM composite control method with dual sliding-mode observers according to the invention.

A hardware environment of the invention may use DSP28335 launched by TI (Texas Instruments) company as a main control chip of an experimental platform, and choose IKCM30F60GA model of Infineon company as a driver module. The experimental platform mainly carries out some basic protections for abnormal states such as overcurrent, overvoltage and overtemperature, and samples real-time current and voltage on PMSM three-phase windings. A control algorithm of the invention may be mainly realized by writing a C language program through CCS6.2 (code composer studio 6.2) software. FIG. 1 illustrates a schematic overall principle block diagram of an embodiment of the invention, and programmed logics are as follows.

A three-phase current $i_{abc}$ and a three-phase voltage $u_{abc}$ on the PMSM windings are sampled through three sampling resistors of a phase current sampling circuit on the driver module, and then are converted into digital signals, and after equal amplitude Clark transformation, real-time sampled current $i_{\alpha\beta}$ and voltage $u_{\alpha\beta}$ in a stationary coordinate system are obtained.

A current state equation of the permanent magnet synchronous motor in the stationary coordinate system is that:

$$\begin{cases} \dfrac{di_\alpha}{dt} = \dfrac{R_s}{L_s} i_\alpha + \dfrac{u_\alpha}{L_s} - \dfrac{e_\alpha}{L_s} \\ \dfrac{di_\beta}{dt} = \dfrac{R_s}{L_s} i_\beta + \dfrac{u_\beta}{L_s} - \dfrac{e_\beta}{L_s} \end{cases}.$$

Figure 2:
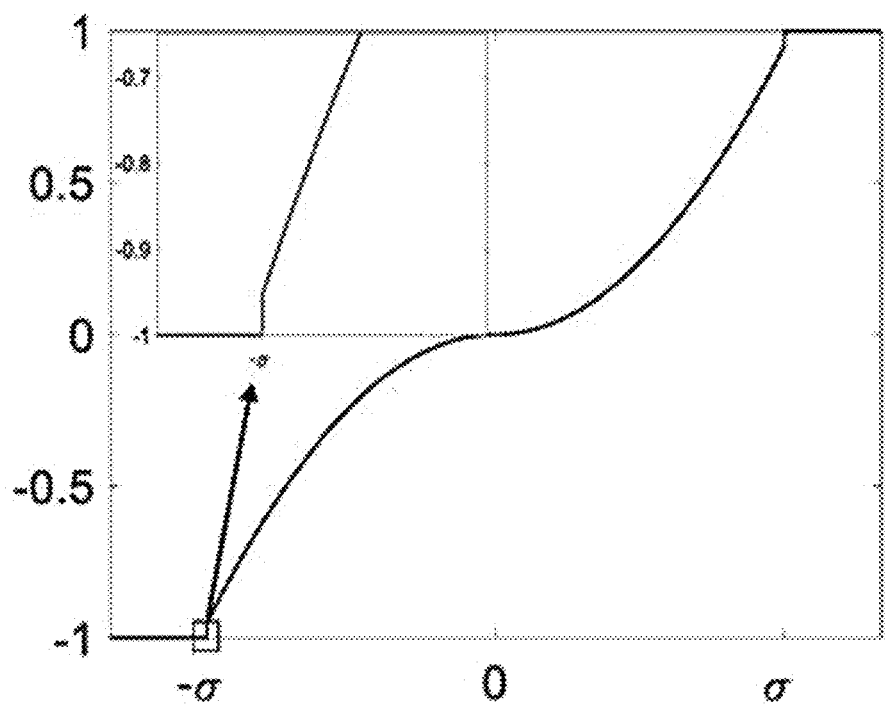
FIG. 2 illustrates an exponential piecewise sliding-mode function according to the invention.
Figure 3:
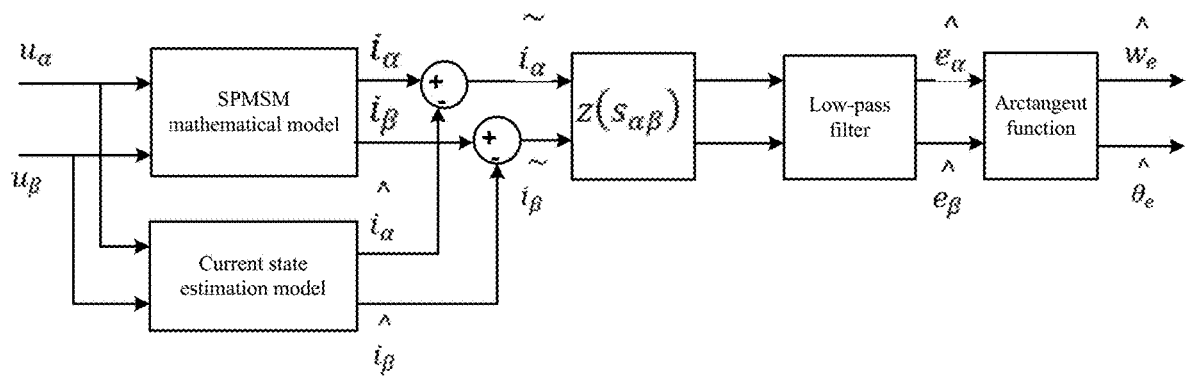
FIG. 3 illustrates a schematic principle block diagram of an exponential piecewise sliding-mode observer according to the invention.

According to the exponential sliding-mode observer in FIG. 3, the current state equation of the permanent magnet synchronous motor in the stationary coordinate system is reconstructed as that:

$$\begin{cases} \dfrac{d\hat{i}_\alpha}{dt} = \dfrac{R_s}{L_s} \hat{i}_\alpha + \dfrac{u_\alpha}{L_s} - \dfrac{Kz(s_\alpha)}{L_s} \\ \dfrac{d\hat{i}_\beta}{dt} = \dfrac{R_s}{L_s} \hat{i}_\beta + \dfrac{u_\beta}{L_s} - \dfrac{Kz(s_\beta)}{L_s} \end{cases}$$

where, K is a sliding-mode gain, $R_s$ and $L_s$ respectively are stator resistance and inductance, $i_\alpha$, $i_\beta$, $u_\alpha$, $u_\beta$ respectively are stator currents and voltages in the stationary coordinate system; $e_\alpha$, $e_\beta$ respectively are components on $\alpha$ and $\beta$ axes of a back EMF, $w_e$ is an electrical angular speed, $\psi_f$ is a permanent magnet flux linkage, $\theta_e$ is an electrical angle, $Z(s_{\alpha\beta})$ is an exponential piecewise sliding-mode function according to the invention and a function characteristic is shown in FIG. 2; "^" represents an estimated value, and "~" represent an error value.

The real-time sampled current $i_{\alpha\beta}$ and voltage $u_{\alpha\beta}$ sampled by the phase current sampling circuit on the driver module are used as input, the estimated current $\hat{i}_{\alpha\beta}$ is obtained after an integral operation, and then subtracted by the real-time sampled current $i_{\alpha\beta}$ to obtain the real-time current error $\tilde{i}_{\alpha\beta}$. The real-time error $\tilde{i}_{\alpha\beta}$ is used as input of the exponential piecewise sliding-mode function $Z(s_{\alpha\beta})$, then is multiplied by the sliding-mode gain K, and a low-pass filter is used to filter out redundant high-order harmonic interference in an equivalent back EMF to obtain the estimated back EMF $\hat{e}_\alpha$ and $\hat{e}_\beta$, at this time, $\hat{e}_\alpha = -\hat{w}_e \psi_f \sin\hat{\theta}_e$, $\hat{e}_\beta = \hat{w}_e \psi_f \cos\hat{\theta}_e$. $\hat{e}_\alpha$ and $\hat{e}_\beta$ are input to a divider for division operation to obtain a tangent value of an estimated electrical angle $\hat{\theta}_e$, and then the estimated electrical angle $\hat{\theta}_e$ is obtained through an arctangent function operation, $\hat{e}_\alpha$ and $\hat{e}_\beta$ are first performed with calculation of the sum of squares and then performed with calculation of square root to obtain $\hat{w}_e \psi_f$, and the obtained $\hat{w}_e \psi_f$ then is divided by the permanent magnet flux linkage $\psi_f$ through a divider to obtain an estimated electrical angular speed $\hat{w}_e$, and the estimated electrical angle $\hat{\theta}_e$ and the estimated electrical angular speed $\hat{w}_e$ are used to realize speed loop closed-loop and Park transformation of vector control for the permanent magnet synchronous motor.

An embodiment of the invention transforms the estimated electrical angular speed $\hat{w}_e$ calculated by the exponential sliding-mode observer in FIG. 3 into an estimated mechanical angular speed $\hat{w}_m$ as follows:

$$\hat{w}_m = \hat{w}_e / p$$

where p is a pole pair number.

The transformed estimated mechanical angular speed $\hat{w}_m$ and a feedback q-axis current $i_q$ (obtained by Clark transformation and park transformation after sampling the three-phase current on the PMSM windings) are input a load sliding-mode observer designed by the invention, and an estimated load torque $\hat{T}_L$ is output. The load sliding-mode observer as designed is as follows:

$$\begin{bmatrix} \hat{w}_m \\ \hat{T}_L \end{bmatrix} = \begin{bmatrix} 0 & -\dfrac{1}{J} \\ 0 & 0 \end{bmatrix} \begin{bmatrix} \hat{w}_m \\ \hat{T}_L \end{bmatrix} + \begin{bmatrix} \dfrac{1}{J} \\ 0 \end{bmatrix} T_e + \begin{bmatrix} 1 \\ l \end{bmatrix} U$$

where $s_w$ is a difference of a mechanical angular speed observed by the load sliding-mode observer subtracting the mechanical angular speed observed by the exponential sliding-mode observer, and a sliding-mode control law is $U = -a_1 \text{sign}(s_w) - a_2 s_w$; $a_1$ and $a_2$ are control parameters.

According to an electromagnetic torque formula of a surface-mounted permanent magnet synchronous motor that $T_e = T_L = 1.5 \psi_f i_q$, the load torque $\hat{T}_L$ estimated by the load sliding-mode observer is transformed into a q-axis current compensation value, and added to the output of rotational speed loop piecewise PI controller for feedforward compensation, so that when the system is suddenly added with a load, a sudden drop of speed can be smaller and the response can be faster, thereby improving the load capability of the system.

Figure 4:
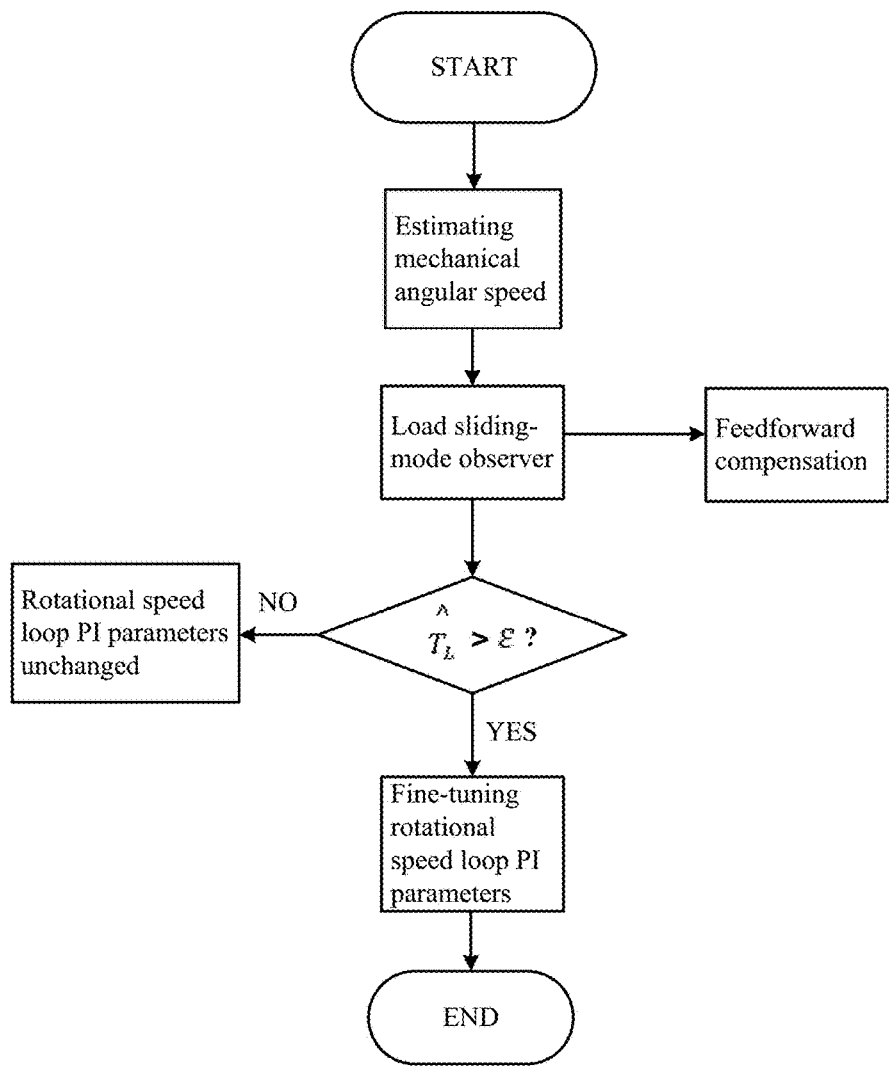
FIG. 4 illustrates a schematic flowchart of a piecewise PI controller according to the invention.

Because the temperature of a motor will rise and the inductance parameter of the motor will change greatly during an on-load operation of the motor, it is difficult for a single PI controller to adapt to the two working conditions of no-load and on-load, the illustrated embodiment of the invention uses the load torque estimated by the designed load sliding-mode observer as a judgment condition of the rotational speed loop piecewise PI controller, and fine-tunes parameters of the rotational speed loop piecewise PI controller. FIG. 4 illustrates a schematic flowchart of the piecewise PI controller according to the invention, and adjustment criteria of parameters of the piecewise PI controller as follows.

(1) when the estimated load torque $\hat{T}_L$ is less than a preset error tolerance $\varepsilon$, PI parameters of rotational speed outer loop with no-load operation are used.

(2) when the estimated load torque $\hat{T}_L$ is greater than the preset error tolerance $\varepsilon$, PI parameters of rotational speed outer loop with on-load operation are used.

The output $i_q^*$ of the rotational speed outer loop piecewise PI controller after feedforward compensation is subtracted with the feedback q-axis actually sampled current $i_q$ (obtained by Clark transformation and park transformation after sampling the three-phase current on the PMSM windings) in a synchronous rotation coordinate system to obtain the current error $\tilde{i}_q$, the current error $\tilde{i}_q$ then is input to a second-order sliding-mode controller based on a super-twisting algorithm according to the invention to output an estimated q-axis voltage $\hat{u}_q$. The second-order sliding-mode controller based on the super-twisting algorithm is as follows:

$$\begin{cases} u_q = -K_p|s_q|^{0.5}\text{sign}(s_q) + u_{sq} \\ \dfrac{du_{sq}}{dt} = K_i\text{sign}(s_q) \end{cases},$$

Where, $s_q$ is a difference of an input value of the piecewise PI controller subtracting the feedback q-axis current value.

The outputs of a d-axis current loop PI controller and the q-axis super-twisting based second-order sliding-mode controller, after Park inverse transformation, are input to the control chip DSP28335, and by means of a modulation of space vector pulse width modulation (SVPWM) algorithm, three pairs of complementary driving signals are obtained to drive on-off of IGBT transistors on three legs in a IPM driver module, and thereby output a three-phase sinusoidal current to the permanent magnet synchronous motor for power supply.

In summary, the composite control method with the dual sliding-mode observers for realizing sensorless control of a permanent magnet synchronous motor in medium and high domains, designs an exponential piecewise sliding-mode function, which has a saturation characteristic of switching function outside a boundary layer, has a small part of step characteristics at the boundary layer, and has characteristics of continuity and exponential approach law inside the boundary layer, and therefore it can avoid multiple jump fluctuations at the sliding surface, and the back EMF observed by the exponential piecewise sliding-mode observer as shown in FIG. 3 is more accurately. The estimated back EMF components $\hat{e}_\alpha$ and $\hat{e}_\beta$ are used to estimate a rotor position by means of an inverse tangent function to obtain an estimated rotor position angle $\hat{\theta}_e$ and an estimated electrical angular speed $\hat{\omega}_e$, which can weaken the buffeting phenomenon and improve the accuracy. The estimated electrical angular speed $\hat{\omega}_e$ then is transformed into an estimated mechanical angular speed $\hat{\omega}_m$ as an input of the load sliding-mode observer, and an estimated load torque $\hat{T}_L$ is output, and afterwards the estimated load torque $\hat{T}_L$ is transformed into the q-axis current compensation value and added to the output of the rotational speed loop piecewise PI controller for feedforward compensation, and meanwhile the estimated load torque $\hat{T}_L$ is used as an judgement condition to fine-tune the parameters of the piecewise PI controller, so that the system can adapt to the two working conditions of no-load and sudden load, thereby improving the load capability of the system. The q-axis current inner loop is designed with super-twisting algorithm based second-order sliding-mode controller to improve q-axis current tracking performance and thereby indirectly control electromagnetic torque and reduce torque ripple.

A simulation model of an embodiment of the invention is built with MATLAB/Simulink, and an application effect of the embodiment of the invention will be described in detail below in combination with simulation waveforms.

Figure 5A:
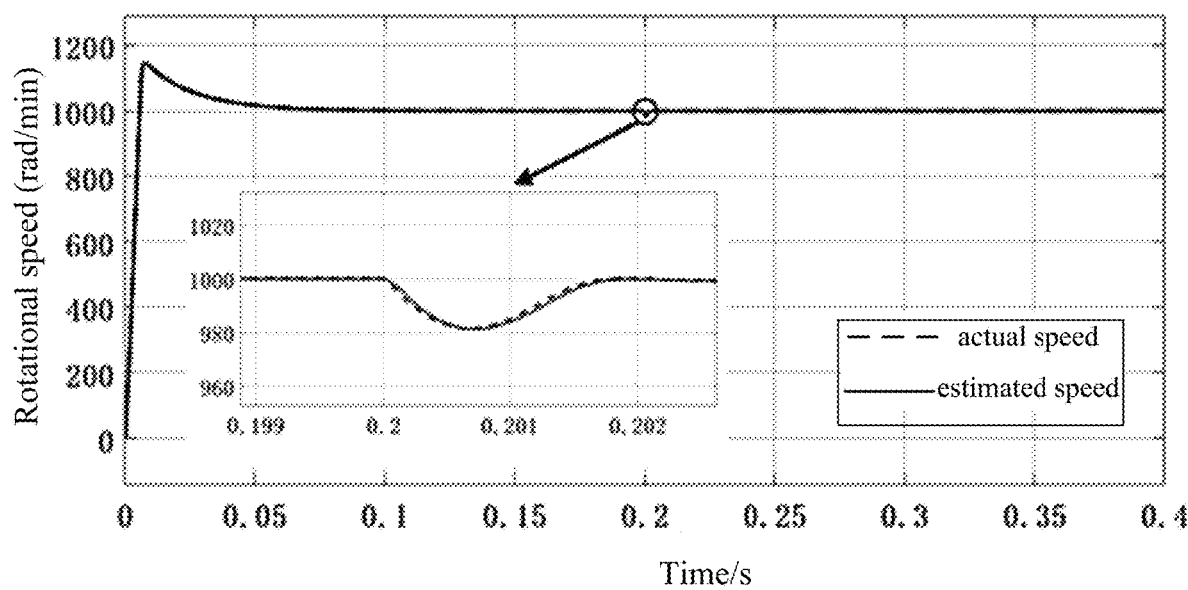
FIG. 5a illustrates a schematic diagram of rotational speed of a SPMSM sensorless composite control method with dual sliding-mode observers according to the invention.
Figure 5B:
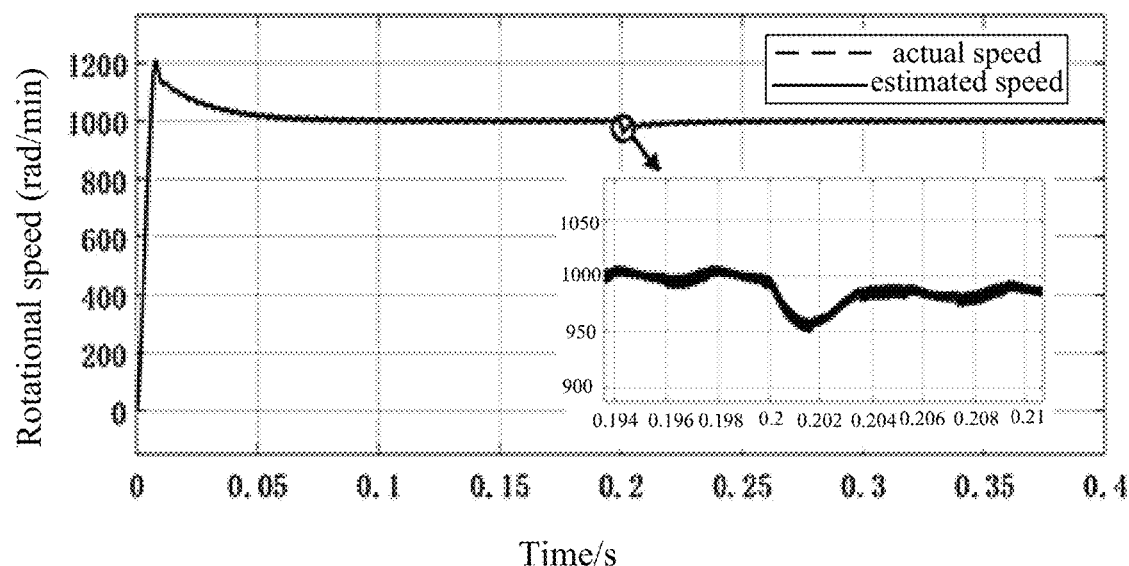
FIG. 5b illustrates a schematic diagram of rotational speed of a SPMSM sensorless control method with a traditional sliding-mode observer.
Figure 6A:
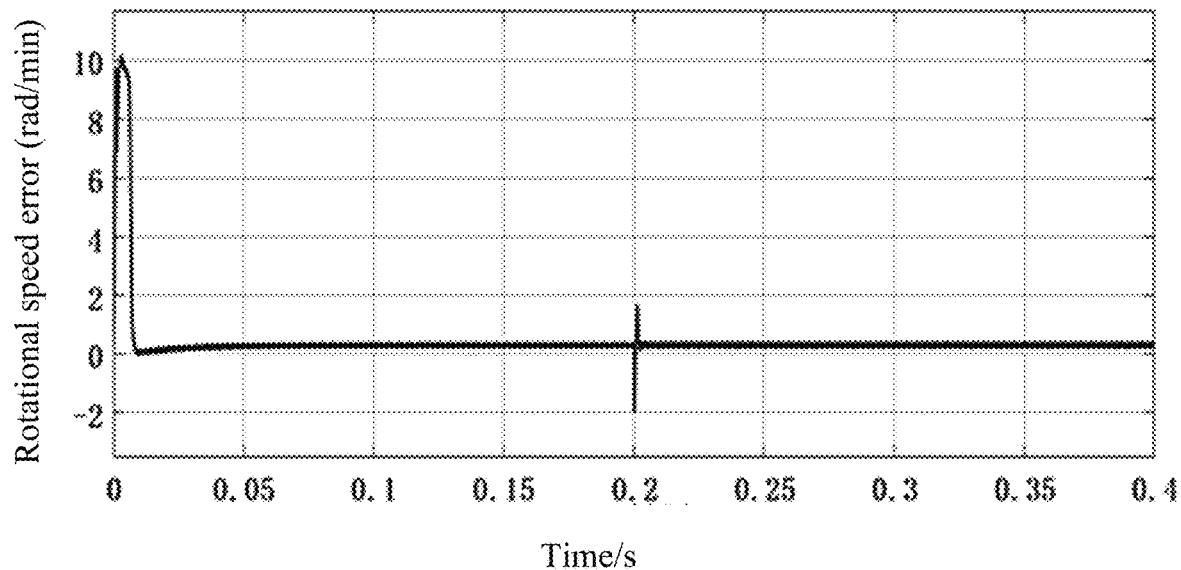
FIG. 6a illustrates a schematic diagram of rotational speed error of the SPMSM sensorless composite control method with the dual sliding-mode observers according to the invention.
Figure 6B:
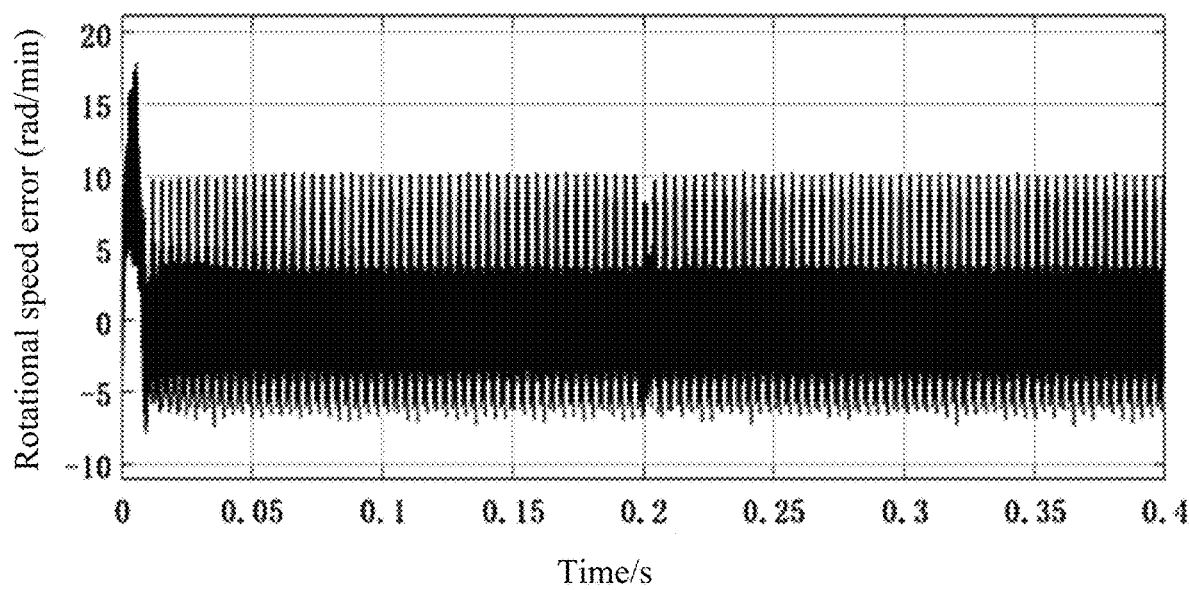
FIG. 6b illustrates a schematic diagram of rotational speed error of the SPMSM sensorless control method with the traditional sliding-mode observer.
Figure 7A:
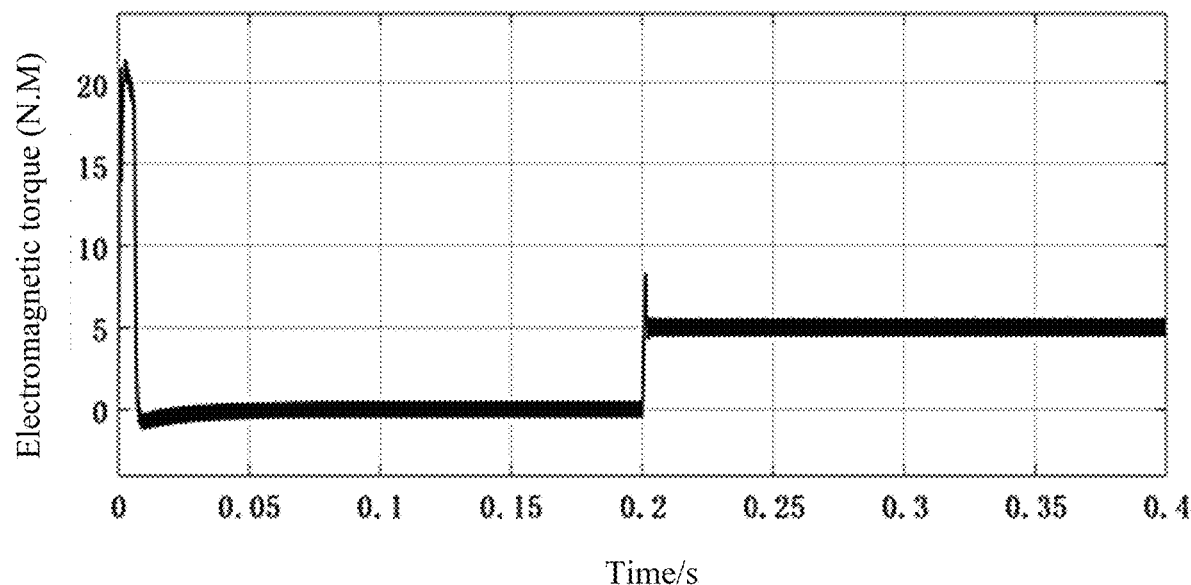
FIG. 7a illustrates a schematic diagram of electromagnetic torque of the SPMSM sensorless composite control method with the dual sliding-mode observers according to the invention.
Figure 7B:
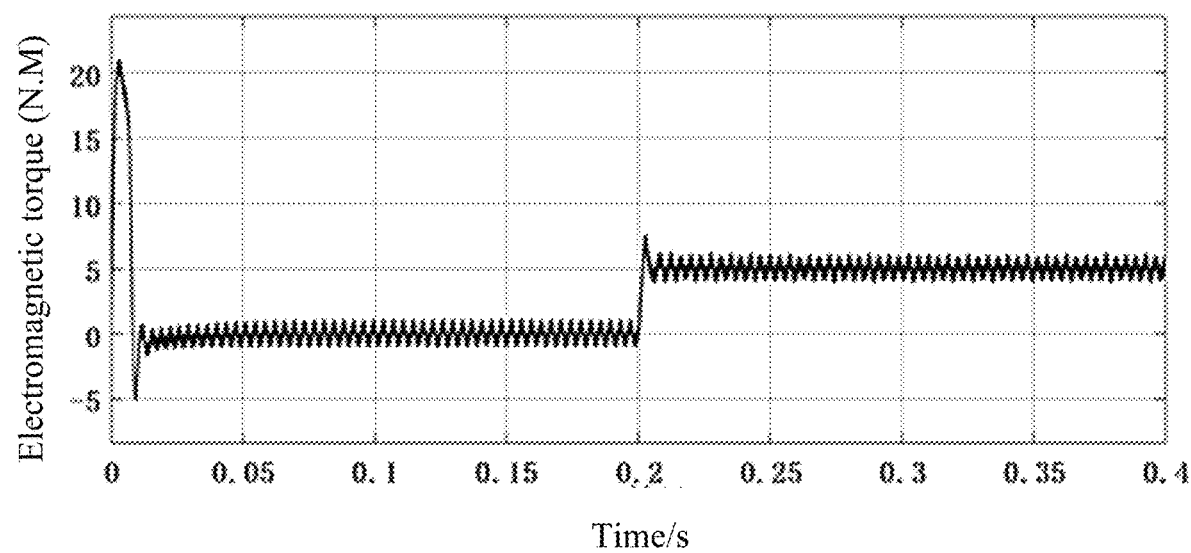
FIG. 7b illustrates a schematic diagram of electromagnetic torque of the SPMSM sensorless control method with the traditional sliding-mode observer.
Figure 8:
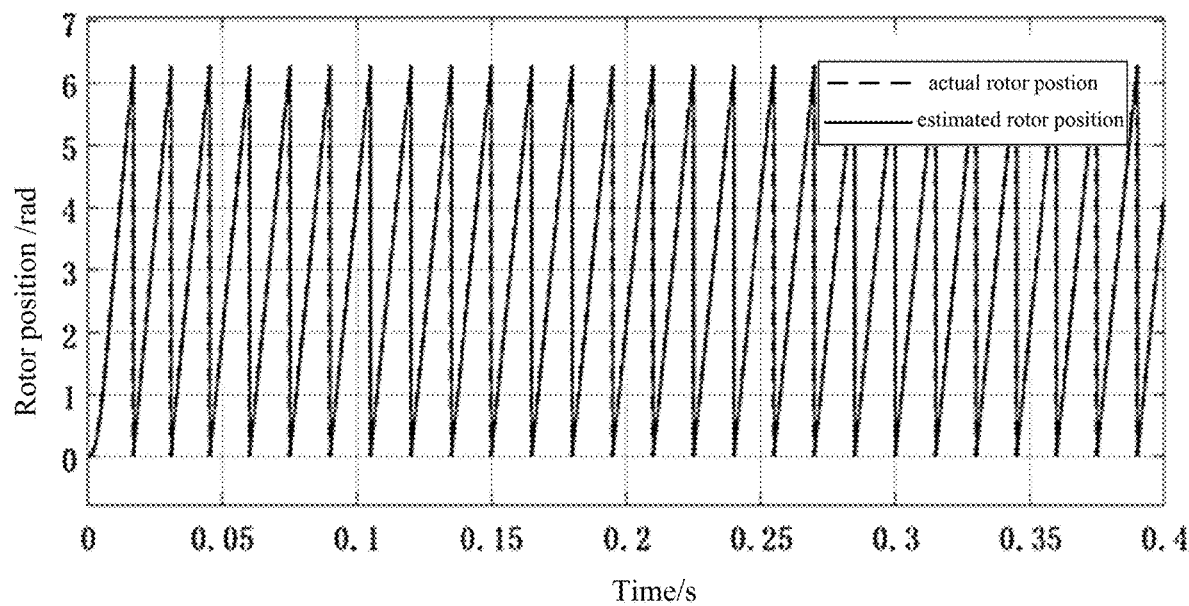
FIG. 8 illustrates a schematic diagram of rotor position of the SPMSM sensorless composite control method with the dual sliding-mode observers according to the invention.
Figure 9:
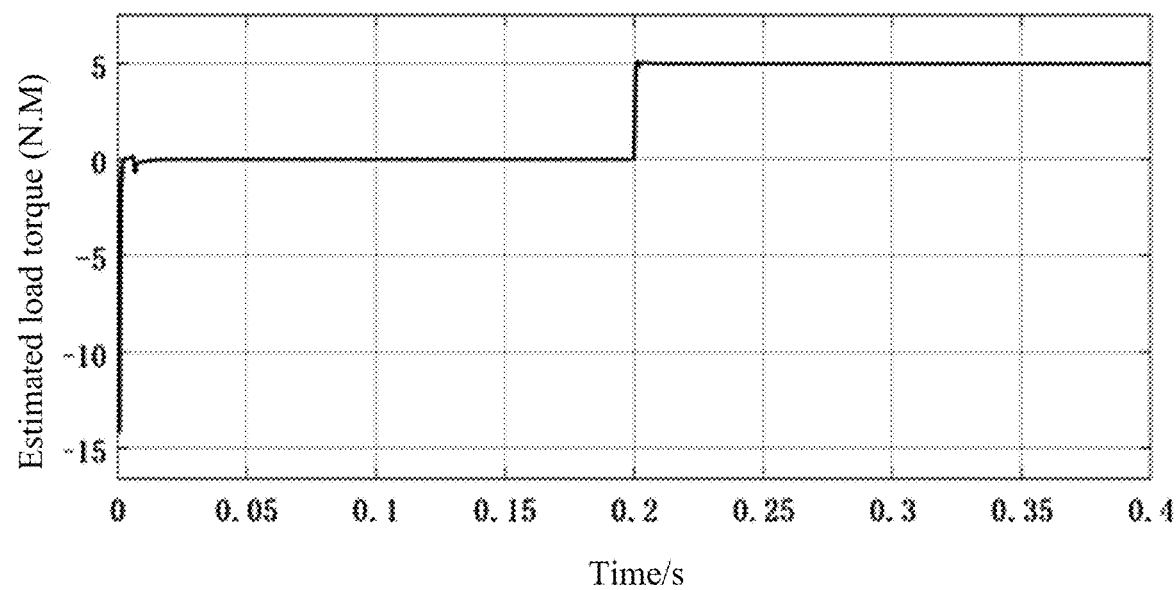
FIG. 9 illustrates a schematic diagram of load torque estimated by a load sliding-mode observer according to the invention.
Figure 10:
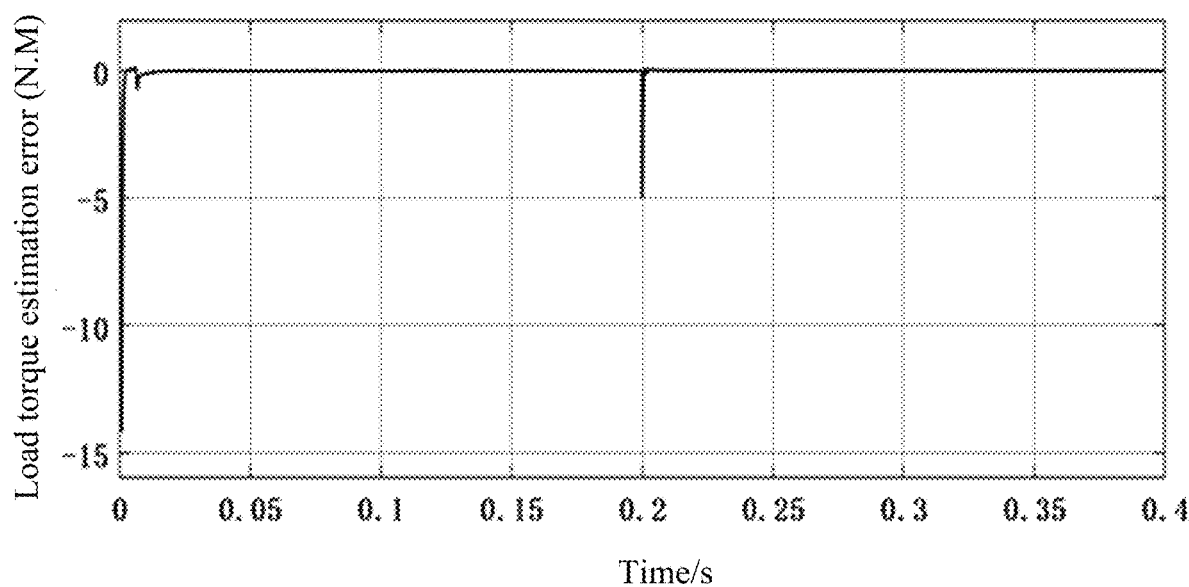
FIG. 10 illustrates a schematic diagram of a load torque error between the load torque estimated by the load sliding-mode observer and an actual load torque according to the invention.

As seen from the comparison of FIG. 5a with FIG. 5b, a rotational speed graph of the embodiment of the invention is smoother than that of the traditional sliding-mode observer, the invention can weaken the buffeting phenomenon well, and when a sudden load of 5 N·M is applied at the time of 0.2 s, compared with the traditional sliding-mode observer, the embodiment of the invention has a smaller sudden drop in rotational speed, faster rotational speed recovery and better load capacity. As seen from the comparison of FIG. 6a with FIG. 6b, a rotational speed estimation error of the embodiment of the invention is smaller than a rotational speed estimation error of the traditional sliding-mode observer, and the rotational speed estimation error of the embodiment of the invention is nearly close to 0. As seen from the comparison of FIG. 7a and FIG. 7b, an electromagnetic torque ripple of the embodiment of the invention is smaller than that of the traditional sliding-mode observer. It can be found from FIG. 9 that the load sliding-mode observer designed by the embodiment of the invention can be used to observe the actual load torque in real-time, and the observation effect is accurate and the response is fast. It can be found from FIG. 10 that an error between the estimated load torque of the embodiment of the invention and the actual load torque is close to 0. It can be seen from this set of simulation diagrams that the SPMSM sensorless composite control method with dual sliding-mode observers according to the invention can weaken the buffeting phenomenon and has better dynamic and steady state performances and load capability, which proves the correctness and effectiveness of the invention.

What is claimed is:

1. A composite control method with dual sliding-mode observers for sensorless control of a permanent magnet synchronous motor (PMSM) in medium and high speed domains, comprising:
   (1) sampling a three-phase current $i_{abc}$ and a three-phase voltage $u_{abc}$, obtaining a current $i_{\alpha\beta}$ and a voltage $u_{\alpha\beta}$ in a stationary coordinate system after performing Clark coordinate transformation on the three-phase current $i_{abc}$ and the three-phase voltage $u_{abc}$, obtaining an estimated current $\hat{i}_{\alpha\beta}$ in the stationary coordinate system after an integral operation based on a reconstructed PMSM current state equation, performing a difference operation between the estimated current $\hat{i}_{\alpha\beta}$ in the stationary coordinate system and the current $i_{\alpha\beta}$ in the stationary coordinate system to obtain a current error $\tilde{i}_{\alpha\beta}$, setting the current error $\tilde{i}_{\alpha\beta}$ as a sliding-mode surface $s_{\alpha\beta}$, and observing a back electromotive force (EMF) according to an exponential piecewise sliding-mode function $z(s_{\alpha\beta})$, wherein an expression of the exponential piecewise sliding-mode function is that:

$$z(s_{\alpha\beta}) = \begin{cases} 1, & s_{\alpha\beta} \geq \sigma \\ \dfrac{s_{\alpha\beta}^2}{\sigma^2(1+e^{-\sigma})}, & 0 \leq s_{\alpha\beta} < \sigma \\ \dfrac{s_{\alpha\beta}^2}{\sigma^2(1+e^{-\sigma})}, & -\sigma \leq s_{\alpha\beta} < 0 \\ -1, & s_{\alpha\beta} < -\sigma \end{cases}$$

where $\sigma$ is a thickness of a boundary layer, and $s_{\alpha\beta}$ is the sliding-mode surface;
   (2) determining a load sliding-mode observer for observation of load torque, using a mechanical angular speed $\hat{\omega}_m$ and a feedback quadrature-axis (q-axis) current as input, outputting an estimated load torque $\hat{T}_L$, using a magnitude of the estimated load torque $\hat{T}_L$ as a judgement condition to switch parameters of a rotational speed outer loop piecewise proportional-integral (PI) controller, and adding the estimated load torque $\hat{T}_L$ on a q-axis estimated current $\hat{i}_q$ for feedforward compensation; and (3) using a q-axis current error $\tilde{i}_q$ as a sliding-mode surface, and determining a second-order sliding-mode controller to indirectly control an electromagnetic torque.

2. The composite control method with dual sliding-mode observers for sensorless control of a permanent magnet synchronous motor in medium and high speed domains according to claim 1, wherein the load sliding-mode observer is to observe a load torque to thereby fine-tune parameters of the piecewise PI controller while add the estimated load torque on a q-axis for feedforward compensation.

3. The composite control method with dual sliding-mode observers for sensorless control of a permanent magnet synchronous motor in medium and high speed domains according to claim 1, wherein a q-axis current inner loop uses the second-order sliding-mode controller based on a super-twisting algorithm, and the sliding-mode surface using the q-axis current error is expressed as that:

$$s_q = \hat{i}_q - i_q; \text{ and}$$

the controller for q-axis current is expressed as that:

$$\begin{cases} u_q = -K_p |s_q|^{0.5} \text{sign}(s_q) + u_{sq} \\ \dfrac{du_{sq}}{dt} = K_i \text{sign}(s_q) \end{cases},$$

where $u_q$ is a q-axis output voltage, sign( ) is sign function, $K_p$ and $K_i$ adjustable parameters.

* * * * *